United States Patent
Noh et al.

(10) Patent No.: US 12,334,258 B2
(45) Date of Patent: Jun. 17, 2025

(54) ENERGY STORAGE MODULE

(71) Applicants: HYUNDAI MOTOR COMPANY, Seoul (KR); Kia Corporation, Seoul (KR); VINATECH CO., LTD., Jeonju-si (KR)

(72) Inventors: Young Woo Noh, Guri-si (KR); Jun Tae Jeong, Bucheon-si (KR)

(73) Assignees: HYUNDAI MOTOR COMPANY, Seoul (KR); KIA CORPORATION, Seoul (KR); VINATECH CO., LTD., Jeonju-si (KR)

( * ) Notice: Subject to any disclaimer, the term of this patent is extended or adjusted under 35 U.S.C. 154(b) by 0 days.

(21) Appl. No.: 17/474,485

(22) Filed: Sep. 14, 2021

(65) Prior Publication Data

US 2022/0208479 A1 Jun. 30, 2022

(30) Foreign Application Priority Data

Dec. 31, 2020 (KR) .................. 10-2020-0189807
Feb. 5, 2021 (KR) .................. 10-2021-0017059

(51) Int. Cl.
*H01G 11/10* (2013.01)
*H01G 2/08* (2006.01)
(Continued)

(52) U.S. Cl.
CPC ............ *H01G 11/10* (2013.01); *H01G 2/08* (2013.01); *H01G 11/26* (2013.01); *H01G 11/52* (2013.01);
(Continued)

(58) Field of Classification Search
CPC .......... H01G 11/10; H01G 2/08; H01G 11/26; H01G 11/52; H01G 11/78; H01M 10/613;
(Continued)

(56) References Cited

U.S. PATENT DOCUMENTS 5,254,415 A * 10/1993 Williams ............. H01M 50/119
429/185
11,658,364 B2 5/2023 Lee et al.
(Continued)

FOREIGN PATENT DOCUMENTS

JP 2007-234545 A 9/2007
JP 2009-146602 A 7/2009
(Continued)

OTHER PUBLICATIONS

Office Action issued in corresponding Korean Patent Application No. 10-2021-0017058 dated Dec. 16, 2022, with English translation.
(Continued)

*Primary Examiner* — Brian R Ohara
*Assistant Examiner* — M. T. Leonard
(74) *Attorney, Agent, or Firm* — MORGAN, LEWIS & BOCKIUS LLP

(57) ABSTRACT

An energy storage module may include first and second energy storage devices each including: an electrode assembly; an external member accommodating the electrode assembly therein; and electrode leads joined to electrodes provided in the electrode assembly, in which the first and second energy storage devices are stacked in a vertical direction V so that a positive electrode lead of the first energy storage device and a negative electrode lead of the second energy storage device are electrically connected to each other.

17 Claims, 13 Drawing Sheets

(51) Int. Cl.
   *H01G 11/26* (2013.01)
   *H01G 11/52* (2013.01)
   *H01G 11/78* (2013.01)
   *H01M 10/04* (2006.01)
   *H01M 10/0525* (2010.01)
   *H01M 10/613* (2014.01)
   *H01M 10/655* (2014.01)
   *H01M 50/204* (2021.01)
   *H01M 50/296* (2021.01)
   *H01M 50/54* (2021.01)

(52) U.S. Cl.
   CPC ........ *H01G 11/78* (2013.01); *H01M 10/0481* (2013.01); *H01M 10/0525* (2013.01); *H01M 10/613* (2015.04); *H01M 10/655* (2015.04); *H01M 50/204* (2021.01); *H01M 50/296* (2021.01); *H01M 50/54* (2021.01)

(58) Field of Classification Search
   CPC .. H01M 10/655; H01M 50/296; H01M 50/54; H01M 50/204; H01M 10/0481; H01M 10/0525
   See application file for complete search history.

(56) References Cited

U.S. PATENT DOCUMENTS

| | | |
|---|---|---|
| 2005/0214642 A1 | 9/2005 | Kim et al. |
| 2006/0170396 A1* | 8/2006 | Ha .................. H01M 50/284 320/116 |
| 2011/0129726 A1 | 6/2011 | Tsukamoto et al. |
| 2014/0234688 A1 | 8/2014 | Cha et al. |
| 2017/0018752 A1 | 1/2017 | Kim et al. |
| 2018/0053920 A1* | 2/2018 | Seo .................. H01M 10/486 |
| 2018/0114964 A1 | 4/2018 | Kim et al. |
| 2018/0287124 A1 | 10/2018 | Kambayashi et al. |
| 2020/0127269 A1* | 4/2020 | Park .................. H01M 50/136 |
| 2020/0335764 A1* | 10/2020 | Yamashita ............ H01M 50/54 |
| 2021/0242548 A1 | 8/2021 | Lee et al. |

FOREIGN PATENT DOCUMENTS

| | | |
|---|---|---|
| JP | 2010-3773 A | 1/2010 |
| KR | 10-2005-0095950 A | 10/2005 |
| KR | 10-2014-0105077 A | 9/2014 |
| KR | 10-2018-0121169 A | 11/2018 |
| KR | 10-2020-0069953 A | 6/2020 |
| KR | 10-2020-0075557 A | 6/2020 |
| WO | WO-2020194937 A1 * | 10/2020 |

OTHER PUBLICATIONS

Office Action issued in corresponding Korean Patent Application No. 10-2021-0017059 dated Dec. 18, 2022, with English translation.

Office Action issued in corresponding U.S. Appl. No. 17/474,481 dated May 26, 2023.

Notice of Allowance issued on Sep. 24, 2023 for corresponding Korean Patent Application No. 10-2021-0017059 (See English Translation).

1 Office Action issued in corresponding U.S. Appl. No. 17/474,481 dated Dec. 11, 2023.

* cited by examiner

ENERGY STORAGE MODULE

CROSS-REFERENCE TO RELATED APPLICATION

The present application claims priority to Korean Patent Application No. 10-2020-0189807 filed on Dec. 31, 2020 and Korean Patent Application No. 10-2021-0017059 filed on Feb. 5, 2021, the entire contents of which is incorporated herein for all purposes by this reference.

BACKGROUND OF THE INVENTION

Field of the Invention

The present invention relates to an energy storage module, and to an energy storage module having a structure in which a plurality of energy storage devices is stacked.

Description of Related Art

In general, terminals configured to be electrically connected to external components are provided in a supercapacitor or a secondary battery including an electrode assembly made by stacking electrodes and separators.

Such a terminal generally has a structure protruding outward from the supercapacitor or the secondary battery. In particular, the terminal generally has a structure protruding from a lateral side of the electrode assembly. An energy storage module having a plurality of supercapacitors or a plurality of secondary batteries generally has a structure in which the supercapacitors or the secondary batteries are connected in series by the terminals.

However, generally, since the terminal protrudes from the lateral side of the electrode assembly, there is a problem in that a separate external component is required to connect the plurality of supercapacitors or the plurality of secondary batteries in series.

In addition, generally, since the terminal protrudes from the lateral side of the electrode assembly, a width of the terminal is relatively small, which causes a problem of an increase in resistance in the terminal and a problem of heat generation.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a structure configured for connecting a plurality of energy storage devices in series without a separate external component.

Various aspects of the present invention are directed to providing a structure configured for minimizing resistance and heat generation in an energy storage device by increasing a width of a terminal.

In one aspect, various aspects of the present invention provide an energy storage module including: a first energy storage device; and a second energy storage device, in which the first and second energy storage devices are connected in series, in which each of the first and second energy storage devices includes: an electrode assembly including electrodes and separators, wherein the electrodes and separators are alternately stacked in a vertical direction of the electrode assembly; an external member accommodating the electrode assembly therein; and electrode leads joined to the electrodes provided in the electrode assembly, and in which the first and second energy storage devices are stacked in the vertical direction V so that the positive electrode lead of the first energy storage device and the negative electrode lead of the second energy storage device are electrically connected to each other.

The electrodes may include a positive electrode and a negative electrode, the electrode leads may include: a positive electrode lead having one side joined, to the positive electrode; and a negative electrode lead having one side thereof joined to the negative electrode, first and second through holes may be provided in upper and lower surfaces of the external member in the vertical direction V, respectively, a portion of the positive electrode lead may be provided to face the first through hole, and a portion of the negative electrode lead may be provided to face the second through hole.

The energy storage module may further include: a first terminal portion provided to be in close contact with an upper surface or a lower surface of the first energy storage device; and a second terminal portion provided to be in close contact with an upper surface or a lower surface of the second energy storage device, in which each of the first and second terminal portions may include: a conductive region having an electrically conductive surface and provided to face the electrode leads provided in the first and second energy storage devices; and an insulating region provided at one side of the conductive region and having an electrically insulating surface.

The first terminal portion may be provided in close contact with the upper surface of the first energy storage device, the second terminal portion may be provided in close contact with the upper surface of the second energy storage device, and the conductive region may be provided to face the positive electrode leads provided in the first and second energy storage devices.

The insulating region may include: a connection section extending from the conductive region; and a bent section extending from the connection section, bent from the connection section in the vertical direction V, and provided to surround each of the first and second energy storage devices.

Each of the first and second terminal portions may further include a protruding region extending from the connection section and provided to protrude from the energy storage device in a horizontal direction H.

At least a portion of a surface of the protruding region may have electrical conductivity.

Each of the first and second energy storage devices may further include a conductive material layer attached to the electrode leads.

Each of the first and second energy storage devices may further include a first conductive material layer attached to an upper surface of the positive electrode lead through the first through hole, and the conductive region may be attached to the first conductive material layer.

The energy storage module may further include a cooling member disposed at one side of each of the first and second energy storage devices and provided to be in close contact with the bent section.

The energy storage module may further include a support member disposed at one side of each of the first and second energy storage devices and provided to be in contact with the protruding region provided in each of the first and second terminal portions.

The protruding region may be inserted into the support member.

The protruding region may be joined to the support member.

The energy storage module may further include an elastic pad provided to be in close contact with the upper surface of the external member in the vertical direction V.

The elastic pad may be provided to surround a peripheral region of the conductive region.

The energy storage module may further include a pressing portion provided at one end portion, in the vertical direction V, of a stack made by stacking a plurality of energy storage devices including the first and second energy storage devices in the vertical direction V, and the pressing part may press the plurality of energy storage devices so that the plurality of energy storage devices in the stack is in close contact with one another.

The pressing portion may include: a terminal plate provided to be in close contact with one end portion of the stack in the vertical direction V; an internal plate provided to be in close contact with an external surface of the terminal plate in the vertical direction V; an external plate provided to be spaced from the terminal plate in the vertical direction V; and an elastic member disposed between the internal plate and the external plate and provided to be in close contact with the internal plate and the external plate.

The energy storage module may further include a fastening portion provided to be in close contact with a stack made by stacking a plurality of energy storage devices including the first and second energy storage devices in the vertical direction V, in which the fastening portion has one end portion fastened to an upper end portion of the stack in the vertical direction V and the other end portion fastened to a lower end portion of the stack in the vertical direction V.

The fastening portion may have a section extending from the upper end portion of the stack to the lower end portion of the stack and disposed in the vertical direction V of the stack.

Each of the first and second terminal portions may further include a concave-convex region protruding from the conductive region.

According to various exemplary embodiments of the present invention, it is possible to provide the structure configured for connecting the plurality of energy storage devices in series without a separate external component.

Furthermore, according to various exemplary embodiments of the present invention, it is possible to provide a structure configured for minimizing resistance and heat generation in the energy storage device by increasing a width of the terminal.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
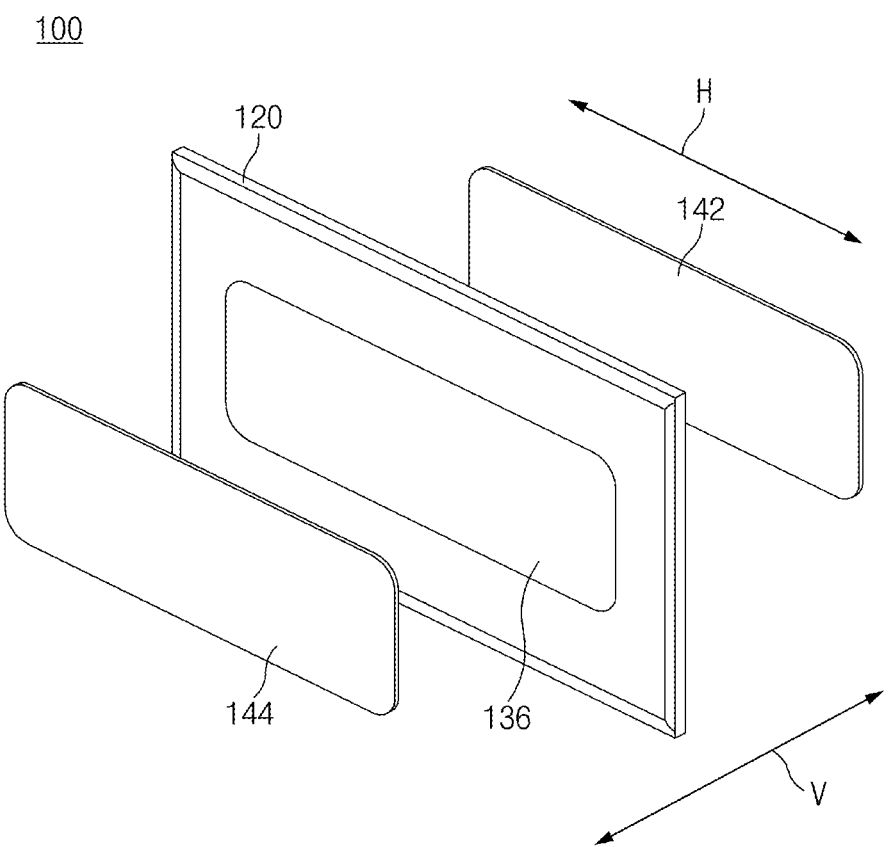
FIG. 1 is an exploded perspective view exemplarily illustrating an energy storage device according to various exemplary embodiments of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, an energy storage device and an energy storage module according to various exemplary embodiments of the present invention will be described with reference to the drawings.

Energy Storage Device

Figure 2:
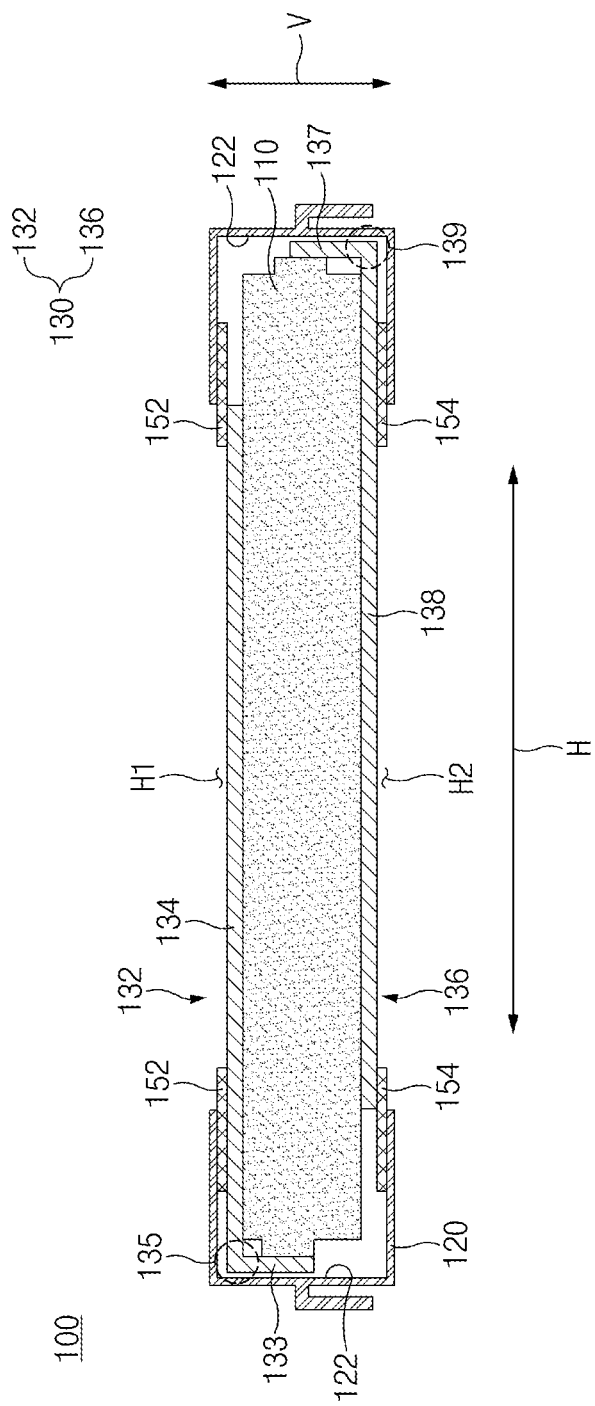
FIG. 2 is a cross-sectional side view exemplarily illustrating the energy storage device according to various exemplary embodiments of the present invention.
Figure 3:
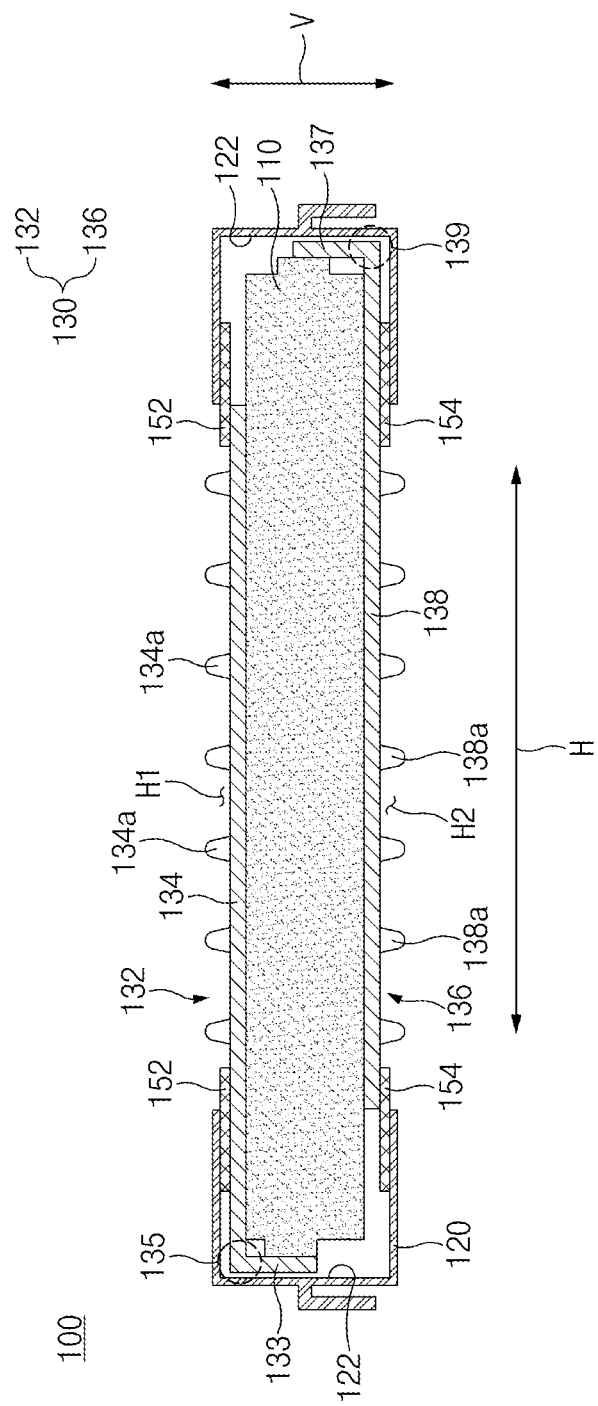
FIG. 3 is a cross-sectional side view exemplarily illustrating another example of the energy storage device according to various exemplary embodiments of the present invention.
Figure 4:
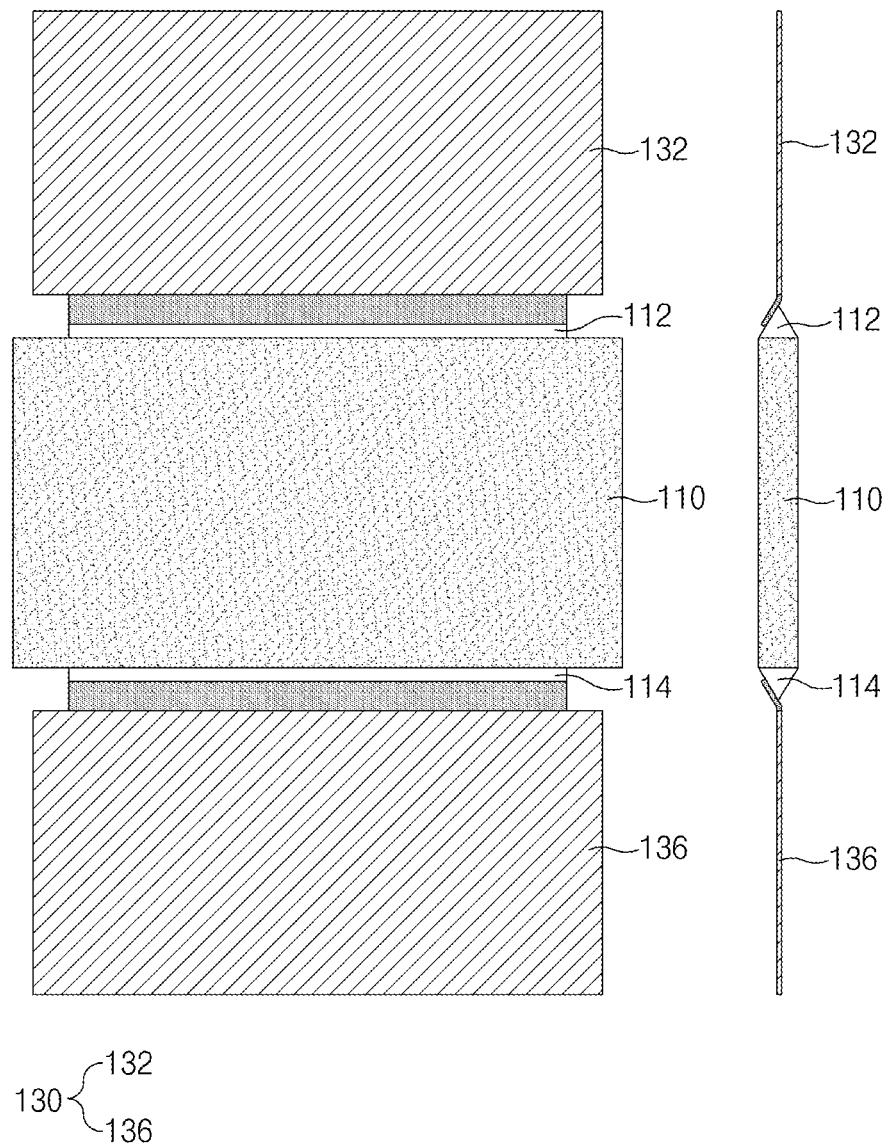
FIG. 4 is a top plan view and a cross-sectional side view exemplarily illustrating a state after the electrode leads are bent during the process of manufacturing the energy storage device according to various exemplary embodiments of the present invention.
Figure 5:
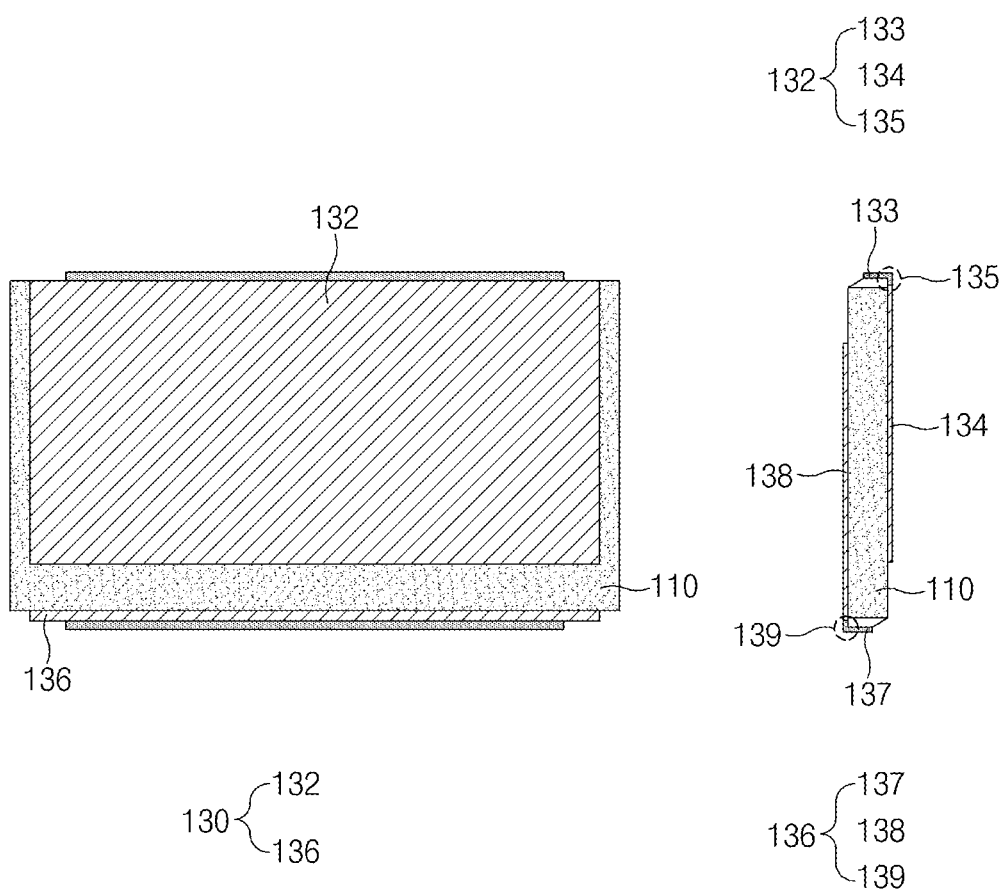
FIG. 5 is a top plan view and a cross-sectional side view exemplarily illustrating a state after the electrode leads are bent during the process of manufacturing the energy storage device according to various exemplary embodiments of the present invention.
Figure 6A:
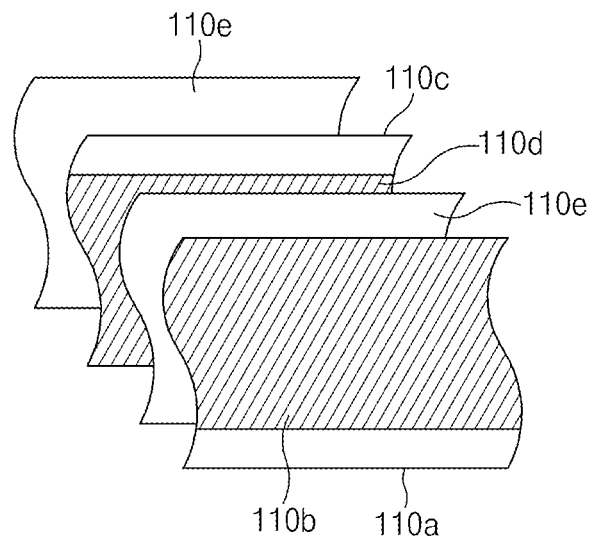
FIG. 6A and FIG. 6B are views exemplarily illustrating an example of a method of manufacturing an electrode assembly provided in the energy storage device according to various exemplary embodiments of the present invention.
Figure 6B:
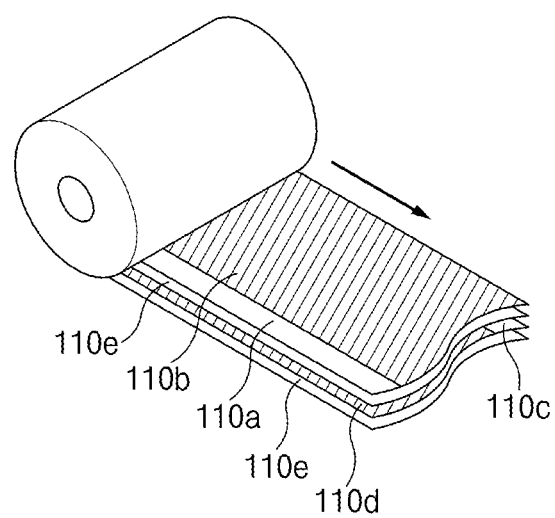

FIG. 1 is an exploded perspective view exemplarily illustrating an energy storage device according to various exemplary embodiments of the present invention, and FIG. 2 is a cross-sectional side view exemplarily illustrating an example of the energy storage device according to various exemplary embodiments of the present invention. FIG. 3 is a cross-sectional side view exemplarily illustrating another example of the energy storage device according to various exemplary embodiments of the present invention, and FIG. 4 is a top plan view and a cross-sectional side view exemplarily illustrating a state before electrode leads are bent during a process of manufacturing the energy storage device according to various exemplary embodiments of the present invention. Furthermore, FIG. 5 is a top plan view and a cross-sectional side view exemplarily illustrating a state after the electrode leads are bent during the process of manufacturing the energy storage device according to various exemplary embodiments of the present invention, and FIG. 6A and FIG. 6B are views exemplarily illustrating an example of a method of manufacturing an electrode assembly provided in the energy storage device according to various exemplary embodiments of the present invention.

As illustrated in FIG. 1 and FIG. 2, an energy storage device 100 according to various exemplary embodiments of the present invention may include an electrode assembly 110. The electrode assembly 110 may have a structure in which electrodes and separators are alternately stacked. Hereinafter, in the exemplary embodiment, a direction in which the electrodes and the separators are alternately stacked in the electrode assembly 110 is defined as a vertical direction V, and a direction extending perpendicularly to the vertical direction V is defined as a horizontal direction H.

The energy storage device 100 may include an external member 120 that accommodates the electrode assembly 110. In more detail, the external member 120 may have a forming portion 122 having a recessed shape, and the electrode assembly 110 may be accommodated in the forming portion 122.

The energy storage device 100 may further include electrode leads 130 connected to the electrodes provided in the electrode assembly 110. As described below, the electrode leads 130 may be configured to electrically connect the energy storage device 100 to another external component (e.g., another energy storage device).

Meanwhile, the electrodes provided in the electrode assembly 110 may include a positive electrode and a negative electrode, and the electrode leads 130 may include a positive electrode lead 132 and a negative electrode lead 136. The positive electrode lead 132 may have one side joined to the positive electrode, and the negative electrode lead 136 may have one side joined to the negative electrode. Meanwhile, according to various exemplary embodiments of the present invention, the electrode leads 130 may be provided in the external member 120. FIG. 2 illustrates that the positive electrode lead 132 and the negative electrode lead 136 are provided in the external member 120.

Meanwhile, the electrode assembly 110 according to various exemplary embodiments of the present invention may be manufactured in various ways. For example, referring to FIG. 6A and FIG. 6B, the electrode assembly 110 may be manufactured by i) manufacturing a positive electrode by applying a positive electrode active material 110b onto a positive electrode current collector 110a, manufacturing a negative electrode by applying a negative electrode active material 110d onto a negative electrode current collector 110c, providing separators 110e, and then alternately disposing the positive electrode, the separator, the negative electrode, and the separator (see FIG. 6A), and ii) winding the stack of the positive electrode, the separator, the negative electrode, and the separator in one direction (see FIG. 6B). In the instant case, the electrode assembly may be a jelly-roll electrode assembly or a stack-and-folding electrode assembly. However, the structure of the electrode assembly 110 is not limited to the above-mentioned structure, and the electrode assembly 110 may be manufactured by various manufacturing methods.

Continuing to refer to FIG. 1 and FIG. 2, the external member 120 provided in the energy storage device 100 according to various exemplary embodiments of the present invention may have through holes. In more detail, a first through hole H1 and a second through hole H2 may be provided in upper and lower surfaces of the external member 120 in the vertical direction V.

In the instant case, according to various exemplary embodiments of the present invention, a portion of the positive electrode lead 132 may be provided to face the first through hole H1, and a portion of the negative electrode lead 136 may be provided to face the second through hole H2. FIG. 1 and FIG. 2 illustrate that the first through hole H1 is provided in a central region of an upper surface of the external member 120, and the second through hole H2 is provided in a central region of a lower surface of the external member 120.

According to various exemplary embodiments of the present invention, the electrode leads provided in the energy storage device 100 are provided on the upper and lower surfaces of the energy storage device 100, respectively. Therefore, the resistance of the electrode leads may be significantly reduced in comparison with the related art in which electrode leads are exposed or protrude through lateral sides of an energy storage device. That is, because of the structural characteristics of the energy storage device 100, an area of each of the upper and lower surfaces of the energy storage device 100 is significantly greater than a lateral surface of the energy storage device 100. Therefore, when the electrode leads are provided on the upper and lower surfaces of the energy storage device, respectively, the electrode lead may also be provided to have a large area. Meanwhile, a magnitude of resistance of an electric conductor is proportional to an area of the electric conductor. Therefore, according to various exemplary embodiments of the present invention, since the resistance of the electrode lead provided in the energy storage device is significantly reduced, the heat generation in the electrode lead may also be significantly reduced.

Furthermore, as described below, according to various exemplary embodiments of the present invention, the plurality of energy storage devices may be connected in series, without a separate external component, by simply stacking, in the vertical direction V, the plurality of energy storage devices 100 provided in an energy storage module 10 (see FIG. 10), and as a result, a process of manufacturing the energy storage module 10 may also be significantly simplified.

Meanwhile, as well known, the positive electrode provided in the electrode assembly 110 may include the positive electrode current collector and the positive electrode active material applied onto one surface or two opposite surfaces of the positive electrode current collector, and the negative electrode may include the negative electrode current collector and the negative electrode active material applied onto one surface or two opposite surfaces of the negative electrode current collector. In the instant case, as illustrated in FIG. 4 and FIG. 5, the positive electrode current collector may have a first non-coated portion 112 which is a region coated with no positive electrode active material, and the negative electrode current collector may have a second non-coated portion 114 which is a region coated with no negative electrode active material. The positive electrode lead 132 and the negative electrode lead 136 may be joined to the first non-coated portion 112 and the second non-coated portion 114, respectively.

In more detail, the positive electrode lead 132 may include a first positive electrode lead region 133 which is a region joined to the first non-coated portion 112, and a second positive electrode lead region 134 which is a region externally exposed through the first through hole H1. Furthermore, the negative electrode lead 136 may include a first negative electrode lead region 137 which is a region joined to the second non-coated portion 114, and a second negative electrode lead region 138 which is a region externally exposed through the second through hole H2. In the instant case, the positive electrode lead 132 may have a first bent portion 135 provided such that a predetermined angle is defined between the second positive electrode lead region 134 and the first positive electrode lead region 133. Furthermore, the negative electrode lead 136 may have a second bent portion 139 provided such that a predetermined angle is defined between the second negative electrode lead region 138 and the first negative electrode lead region 137. That is, according to various exemplary embodiments of the present invention, the positive electrode lead 132 may have a shape bent around the first bent portion 135, and the negative electrode lead 136 may have a shape bent around the second bent portion 139.

In more detail, referring to FIG. 4, the positive electrode lead 132 may be provided at one side of the electrode assembly 110 at which the first non-coated portion 112 is provided, and the negative electrode lead 136 may be provided at the other side of the electrode assembly 110 at which the second non-coated portion 114 is provided. Thereafter, the first non-coated portion 112 and the positive electrode lead 132 may be joined to each other, and the second non-coated portion 114 and the negative electrode lead 136 may be joined to each other.

Thereafter, as illustrated in FIG. 5, the positive electrode lead 132 may be bent around the first bent portion 135 such that the upper surface of the electrode assembly 110 faces the second positive electrode lead region 134. The negative electrode lead 136 may be bent around the second bent portion 139 such that the lower surface of the electrode assembly 110 faces the second negative electrode lead region 138.

Meanwhile, according to various exemplary embodiments of the present invention, the energy storage device 100 may further include conductive material layers 142 and 144 attached to the electrode leads 130. For example, referring to FIG. 1 and FIG. 2, the energy storage device 100 may further include: a first conductive material layer 142 provided in the first through hole H1 and attached to an upper surface of the second positive electrode lead region 134 through the first through hole H1; and a second conductive material layer 144 provided in the second through hole H2 and attached to an upper surface of the second negative electrode lead region 138 through the second through hole H2. The first conductive material layer 142 may have a thickness to the extent that the first conductive material layer 142 protrudes upward to a position above the upper surface of the external member 120, and the second conductive material layer 144 may have a thickness to the extent that the second conductive material layer 144 protrudes downward to a position below the lower surface of the external member 120. Therefore, the positive electrode lead 132 and the negative electrode lead 136 may be easily connected to external components (e.g., electrode leads of another energy storage device).

Meanwhile, as illustrated in FIG. 3, the second positive electrode lead region 134 may further include first protruding portions 134a provided on the upper surface of the second positive electrode lead region 134 and each having a shape protruding convexly upwards. The second negative electrode lead region 138 may further include second protruding portions 138a provided on the lower surface of the second negative electrode lead region 138 and each having a shape protruding convexly downward. In the case in which the first protruding portion 134a and the second protruding portion 138a are provided, the electrode leads provided in the energy storage devices may be more easily connected to one another in series when the energy storage devices are stacked in the vertical direction V. For example, as illustrated in FIG. 3, the first protruding portion 134a may protrude upward to the position above the upper surface of the external member 120, and the second protruding portion 138a may protrude downward to the position below the lower surface of the external member 120.

Meanwhile, the electrode leads 130 provided in the energy storage device 100 need to be electrically insulated from the external member 120. To the present end, according to various exemplary embodiments of the present invention, the energy storage device 100 may include a first sealant layer 152 provided between the second positive electrode lead region 134 and the upper surface of the external member 120 and having one surface joined to the second positive electrode lead region 134 and the other surface joined to the upper surface of the external member 120. Furthermore, the energy storage device 100 may include a second sealant layer 154 provided between the second negative electrode lead region 138 and the lower surface of the external member 120 and having one surface joined to the second negative electrode lead region 138 and the other surface joined to the lower surface of the external member 120. The first sealant layer 152 and the second sealant layer 154 each have electrical insulation. Meanwhile, a coating layer having electrical insulation may be further provided on the internal surface of the external member 120 of the energy storage device 100 according to various exemplary embodiments of the present invention. For example, the coating layer may be a resin coating layer, but the present invention is not limited thereto, and various materials having electrical insulation may be applied to the coating layer.

Meanwhile, referring back to FIG. 4 and FIG. 5, a width of the first non-coated portion 112 may be smaller than a width of the first positive electrode lead region 133 in the region in which the first non-coated portion 112 and the first positive electrode lead region 133 are joined to each other. Furthermore, a width of the second non-coated portion 114 may be smaller than a width of the first negative electrode lead region 137 in the region in which the second non-coated portion 114 and the first negative electrode lead region 137 are joined to each other. To the present end, a notching process of cutting two opposite sides of the current collector of the electrode assembly 110 may be additionally performed during the process of manufacturing the energy storage device 100 according to various exemplary embodiments of the present invention.

An example of a method of manufacturing the energy storage device 100 according to various exemplary embodiments of the present invention will be described below.

The electrode assembly 110 is manufactured, the electrode leads 130 are joined to the electrode assembly 110, the electrode leads 130 are bent, and then the assembly of the electrode assembly and the electrode leads is accommodated in the external member 120 having the forming portion 122. Thereafter, an electrolyte is introduced through one side of the external member 120, and then a process of primarily sealing the external member is performed. Thereafter, the energy storage device 100 may be manufactured by sequentially performing a process of aging the electrode assembly 110, a process of cutting a portion of the external member 120, a degassing process, a process of secondarily sealing the external member 120, and a trimming process of cutting the external member to meet the design specification of the energy storage device 100. However, the method of manufacturing the energy storage device 100 according to various exemplary embodiments of the present invention is not limited to the above-mentioned method.

Meanwhile, the energy storage device 100 according to various exemplary embodiments of the present invention may be a supercapacitor. The supercapacitor refers to an energy storage device configured for storing energy and then instantaneously transmitting high-output power, as necessary. The supercapacitor may have a smaller energy storage capacity but provide a higher output than a general battery. However, the energy storage device 100 according to various exemplary embodiments of the present invention may be applied to various types of electricity storage devices without being limited to the supercapacitor. For example, the energy storage device 100 may also be a secondary battery such as a lithium-ion secondary battery.

Energy Storage Module

Figure 7:
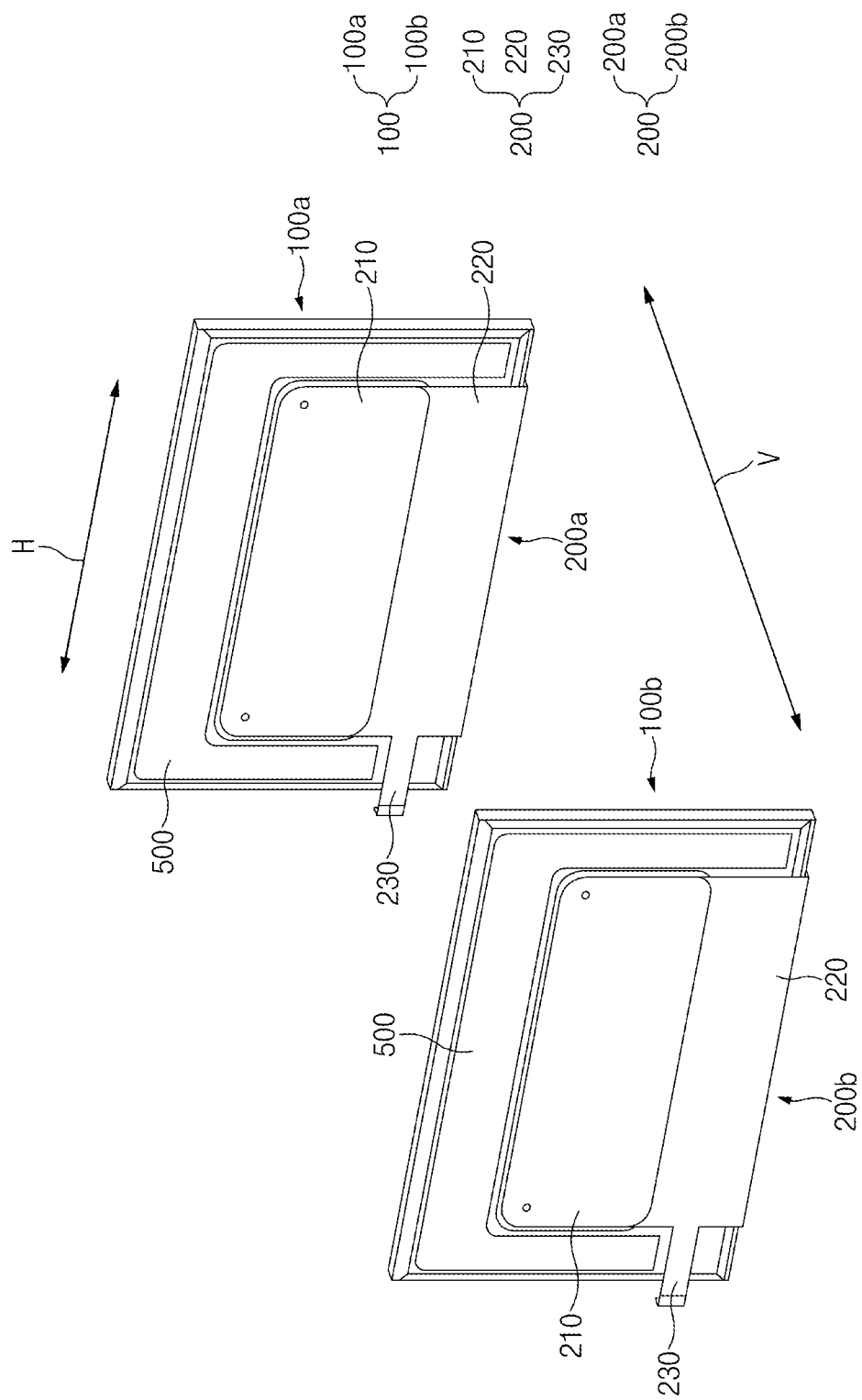
FIG. 7 is a perspective view a first energy storage device and a second energy storage device provided in an energy storage module according to various exemplary embodiments of the present invention.
Figure 8:
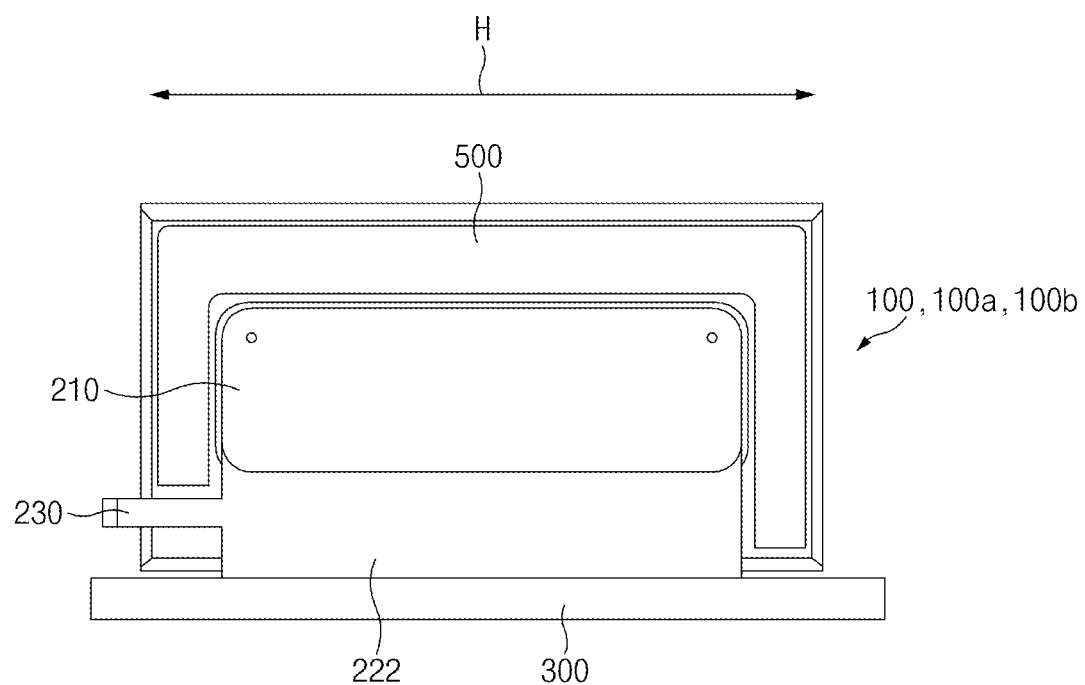
FIG. 8 is a top plan view exemplarily illustrating the energy storage device and peripheral components provided in the energy storage module according to various exemplary embodiments of the present invention.
Figure 9:
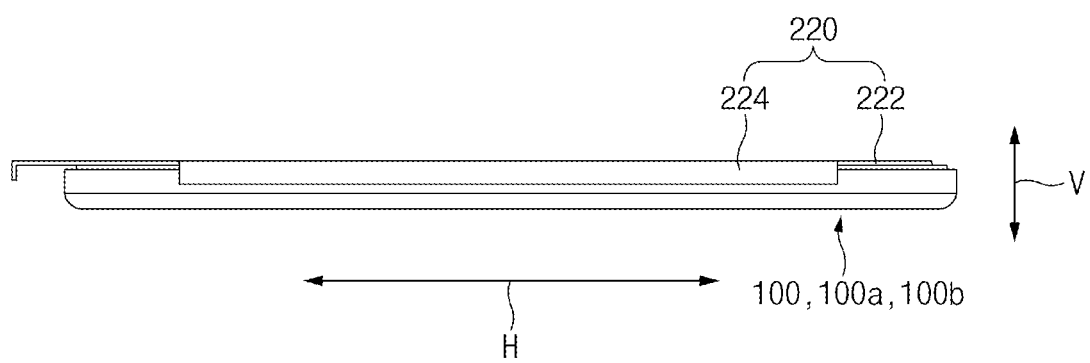
FIG. 9 is a cross-sectional side view exemplarily illustrating the energy storage device and the peripheral components provided in the energy storage module according to various exemplary embodiments of the present invention.
Figure 10:
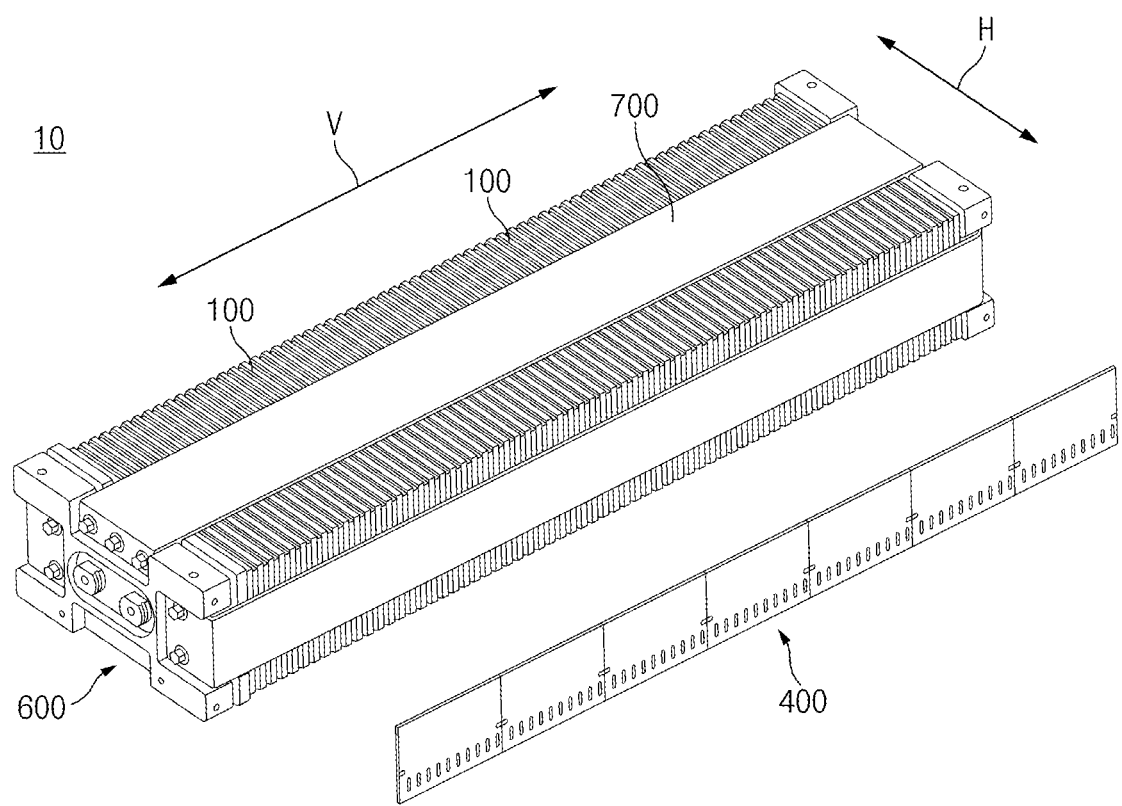
FIG. 10 is a perspective view exemplarily illustrating the energy storage module according to various exemplary embodiments of the present invention.
Figure 11:
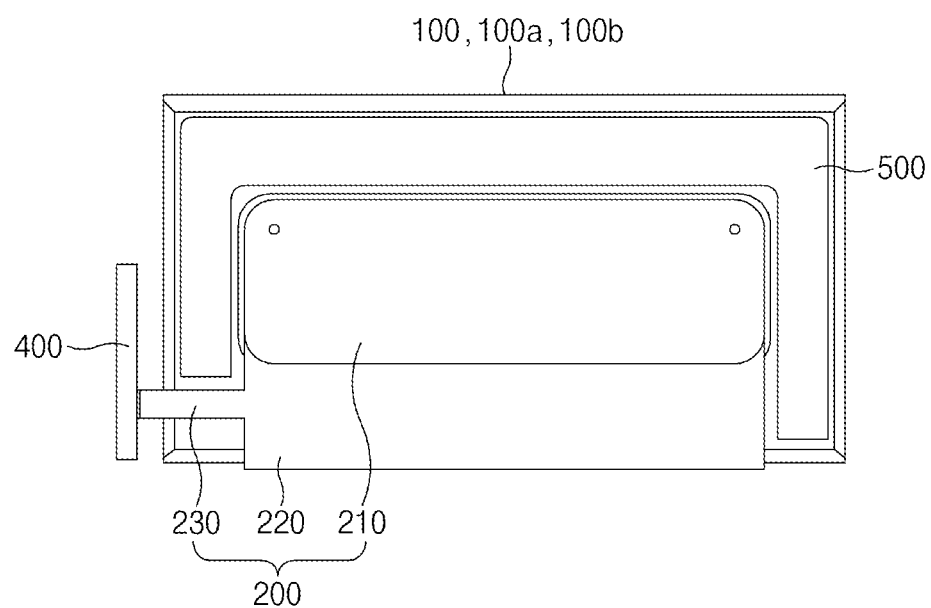
FIG. 11 is a cross-sectional side view exemplarily illustrating the energy storage module according to various exemplary embodiments of the present invention.
Figure 12:
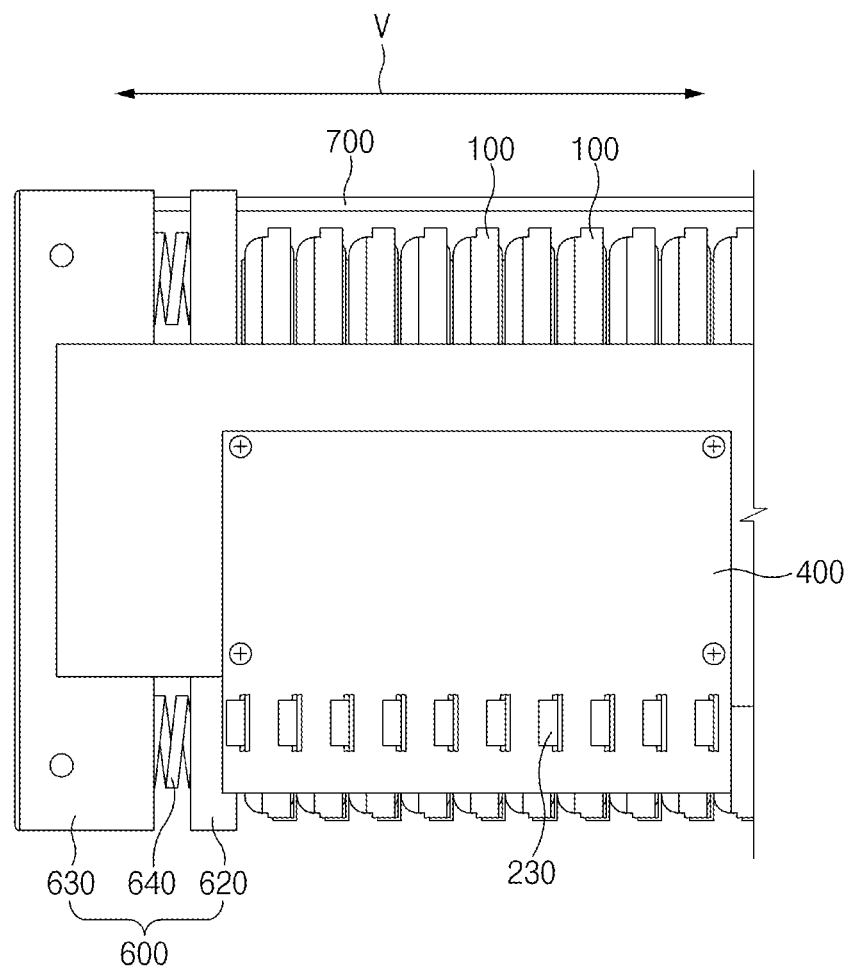
FIG. 12 is an enlarged perspective view exemplarily illustrating a pressing portion and peripheral components in the energy storage module according to various exemplary embodiments of the present invention.
Figure 13:
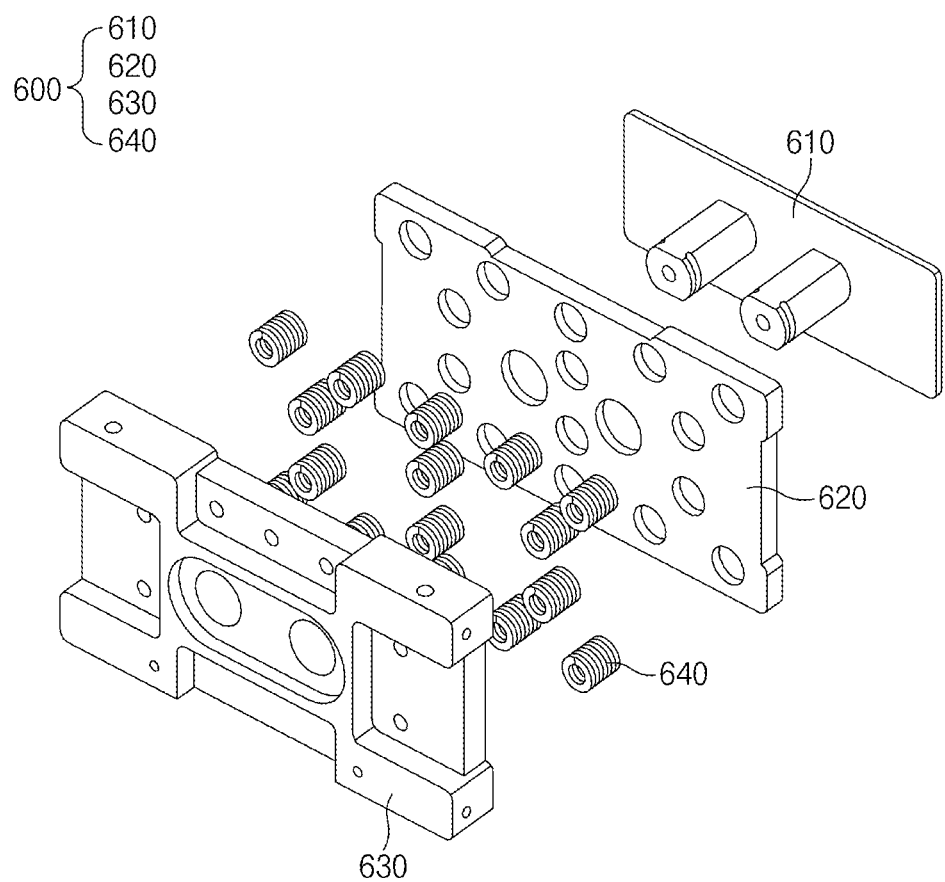
FIG. 13 is an exploded perspective view exemplarily illustrating the pressing portion provided in the energy storage module according to various exemplary embodiments of the present invention.

FIG. 7 is a perspective view a first energy storage device and a second energy storage device provided in an energy storage module according to various exemplary embodiments of the present invention, and FIG. 8 is a top plan view exemplarily illustrating the energy storage device and peripheral components provided in the energy storage module according to various exemplary embodiments of the present invention. FIG. 9 is a cross-sectional side view exemplarily illustrating the energy storage device and the peripheral components provided in the energy storage module according to various exemplary embodiments of the present invention, and FIG. 10 is a perspective view exemplarily illustrating the energy storage module according to various exemplary embodiments of the present invention. FIG. 11 is a cross-sectional side view exemplarily illustrating the energy storage module according to various exemplary embodiments of the present invention, and FIG. 12 is an enlarged perspective view exemplarily illustrating a pressing portion and peripheral components in the energy storage module according to various exemplary embodiments of the present invention. Furthermore, FIG. 13 is an exploded perspective view exemplarily illustrating the pressing portion provided in the energy storage module according to various exemplary embodiments of the present invention.

The energy storage module 10 according to various exemplary embodiments of the present invention may include the plurality of energy storage devices. In more detail, the plurality of energy storage devices may be connected to one another in series. For example, the energy storage module 10 may include a first energy storage device 100a and a second energy storage device 100b, and the first energy storage device 100a and the second energy storage device 100b may be structured to be connected to one another in series. However, the present invention is not limited to the configuration in which the energy storage module 10 includes only the first energy storage device 100a and the second energy storage device 100b. Alternatively, the energy storage module 10 according to various exemplary embodiments of the present invention may include three or more energy storage devices. However, the above-mentioned first and second energy storage devices 100a and 100b are selected and named for convenience to easily describe the energy storage module 10 according to various exemplary embodiments of the present invention. The following description of the first and second energy storage devices may be equally applied to all the energy storage devices provided in the energy storage module 10 according to various exemplary embodiments of the present invention.

The above-mentioned description of the energy storage device 100 according to various exemplary embodiments of the present invention described with reference to FIG. 1, FIG. 2, FIG. 3, FIG. 4, and FIG. 5 may also be equally applied to the first and second energy storage devices. That is, each of the first and second energy storage devices may include the electrode assembly having the structure in which the electrodes and the separators are alternately stacked in the vertical direction V, the external member having the forming portion for accommodating the electrode assembly and configured to accommodate the electrode assembly in the forming portion, and the electrode leads joined to the electrodes provided in the electrode assembly. Furthermore, the electrodes may include the positive electrode and the negative electrode, and the electrode leads may include the positive electrode lead having one side joined to the positive electrode and the negative electrode lead having one side joined to the negative electrode. Furthermore, the first through hole and the second through hole may be provided in the upper and lower surfaces of the external member in the vertical direction V, respectively, a portion of the positive electrode lead may be provided to face the first through hole, and a portion of the negative electrode lead may be provided to face the second through hole.

In the instant case, referring to FIGS. 2 and 7, according to various exemplary embodiments of the present invention, the first energy storage device 100a and the second energy storage device 100b may be stacked in the vertical direction V so that the electrode lead 130 of the first energy storage device 100a and the electrode lead 130 of the second energy storage device 100b may be electrically connected to each other. For example, as illustrated in FIGS. 2 and 7, the first energy storage device 100a and the second energy storage device 100b may be stacked in the vertical direction V so that the positive electrode lead 132 of the first energy storage device 100a and the negative electrode lead 136 of the second energy storage device 100b are electrically connected to each other.

In more detail, referring to FIGS. 7 to 9, the energy storage module 10 may further include terminal portions 200 provided to be in close contact with the upper or lower surfaces of the energy storage devices. For example, the terminal portions 200 may include a first terminal portion 200a provided to be in close contact with the upper or lower surface of the first energy storage device 100a, and a second terminal portion 200b provided to be in close contact with the upper or lower surface of the second energy storage device 100b. FIG. 7, FIG. 8 and FIG. 9 illustrate that the first terminal portion 200a is provided to be in close contact with the upper surface of the first energy storage device 100a on which the positive electrode lead 132 is provided, and the second terminal portion 200b is provided to be in close contact with the upper surface of the second energy storage device 100b on which the positive electrode lead 132 is provided.

As described below, the terminal portion 200 may be configured to transfer heat, generated from the energy storage device 100, to the outside. For example, in the case in which the terminal portion 200 is provided to be in close contact with the positive electrode lead 132, the heat generated from the positive electrode lead 132 may be transferred to the terminal portion 200 by conduction, and the heat transferred to the terminal portion 200 may be released to the outside through a cooling member to be described below.

Furthermore, the terminal portion 200 may also serve to connect the two energy storage devices 100 directly to a voltage measurement device to measure a voltage between the two energy storage devices 100 connected in series in the energy storage module 10.

Meanwhile, as illustrated in FIG. 8, the terminal portion 200 may include a conductive region 210 having a surface at least having electrical conductivity and provided to face the electrode lead provided in the energy storage device 100, and an insulating region 220 provided at one side of the conductive region 210 and having a surface at least having electrical insulation. For example, the terminal portion 200 may include a conductive member having electrical conductivity, and an insulating member applied onto a surface of the conductive member and having electrical insulation. The insulating region 220 may be a region in which the insulating member is applied, and the conductive region 210 may be a region in which the insulating member is not applied and the conductive member is exposed to the outside. Therefore, the electrical conduction may be possible in the terminal portion 200 even in a section in which the insulating region 220 is provided.

For example, the conductive region 210 may be provided to face the positive electrode lead provided in the energy storage device 100. Furthermore, the conductive region 210 and the insulating region 220 may be directly connected to each other. The configuration in which the conductive region and the insulating region are directly connected to each other may mean that the conductive region and the insulating region are in contact with each other. In more detail, the conductive region 210 of the terminal portion 200 may be provided to be in close contact with the electrode lead 130 (see FIG. 2), and more particularly, the positive electrode lead 132 (see FIG. 2). Therefore, the conductive region 210 may also serve as an electrically conductive member that electrically connects the plurality of energy storage devices when the plurality of energy storage devices is stacked so that the plurality of energy storage devices is connected in series. Alternatively, the energy storage module 10 according to various exemplary embodiments of the present invention may not have the terminal portion 200.

Continuing to refer to FIG. 8 and FIG. 9, the insulating region 220 provided in the terminal portion 200 may include a connection section 222 directly connected to the conductive region 210 and extending from the conductive region 210, and a bent section 224 extending from the connection section 222, bent from the connection section 222 in the vertical direction V, and provided to surround the lateral side of the energy storage device 100.

Furthermore, terminal portion 200 may further include a protruding region 230 extending from the connection section 222 and protruding from the energy storage device 100 in the horizontal direction H. In the instant case, at least a portion of a surface of the protruding region 230 may have electrical conductivity. For example, as illustrated in FIG. 8, a direction in which the protruding region 230 extends from the connection section 222 may be perpendicular in a direction in which the conductive region 210 extends from the connection section 222.

Meanwhile, as described above, the energy storage device 100 may further include the conductive material layers 142 and 144 (see FIG. 1) attached to the electrode leads 130. Therefore, each of the first and second energy storage devices 100a and 100b provided in the energy storage module 10 according to various exemplary embodiments of the present invention may also further include the conductive material layers 142 and 144 (see FIG. 1) attached to the electrode leads 130. In more detail, the energy storage device 100 may further include the first conductive material layer 142 (see FIG. 1) attached to the upper surface of the positive electrode lead 132 through the first through hole H1 (see FIG. 2), and the conductive region 210 may be attached to the first conductive material layer 142. Furthermore, the energy storage device 100 may further include the second conductive material layer 144 (see FIG. 1) attached to the lower surface of the negative electrode lead 136 through the second through hole H2 (see FIG. 2).

As described above, the energy storage module 10 according to various exemplary embodiments of the present invention may not have the terminal portion 200. In the instant case, the first conductive material layer 142 (see FIG. 1) attached to the upper surface of the positive electrode lead 132 may be provided to be in close contact with the second conductive material layer 144 (see FIG. 1) attached to the lower surface of the negative electrode lead 136. Therefore, the plurality of energy storage devices 100 may be coupled to one another in series.

Meanwhile, as illustrated in FIG. 8 and FIG. 9, the energy storage module 10 may further include a cooling member 300 disposed at one side of the energy storage device 100 and provided to be in close contact with the bent section 224 of the terminal portion. The cooling member 300 may be configured to cool an electrode terminal, for example, a positive electrode terminal provided in the energy storage module. That is, according to various exemplary embodiments of the present invention, since the bent section 224 may be provided to be in close contact with the cooling member 300, the heat generated from the electrode terminal may be transferred to the cooling member 300 via the conductive region 210, the connection section 222, and the bent section 224 of the terminal portion. The cooling member 300 may release the heat in an air-cooled or water-cooled manner.

Meanwhile, referring to FIG. 10, FIG. 11, and FIG. 12, the energy storage module 10 according to various exemplary embodiments of the present invention may further include a support member 400 provided at one side of the plurality of energy storage devices including the first and second energy storage devices. The support member 400 may be provided to be in contact with the protruding regions 230 of the plurality of terminal portions including the first and second terminal portions 200a and 200b. For example, the support member 400 may be a PCB, but the material of the support member is not limited thereto. In the instant case, according to various exemplary embodiments of the present invention, the protruding regions 230 of the plurality of terminal portions may be inserted into the support member 400 or joined to the support member 400.

According to various exemplary embodiments of the present invention, it is possible to easily measure, without a separate additional component, a voltage between the energy storage devices 100 connected in series in the energy storage module 10. That is, according to various exemplary embodiments of the present invention, the two energy storage devices, which are to be subjected to the voltage measurement, are selected, and then the voltage between the protruding regions 230 of the two energy storage devices is measured. Therefore, the voltage between the two energy storage devices may be easily measured. In the instant case, the support member 400 is configured to support and fix the plurality of protruding regions 230 provided in the energy storage module 10.

Meanwhile, referring to FIGS. 7 and 8, the energy storage module 10 may further include an elastic pad 500 provided to be in close contact with the upper surface of the external member 120 of the energy storage device 100 in the vertical direction V. According to various exemplary embodiments of the present invention, the energy storage device 100 may be pressed in the vertical direction V by an elastic force of the elastic pad 500, which makes it possible to maximize the performance of the energy storage module and improve a degree of alignment between the energy storage devices during the process of manufacturing the energy storage module.

In more detail, the elastic pad 500 may be provided to surround a peripheral region of the conductive region 210. It may be understood that the elastic pad 500 is provided not to overlap the conductive region 210 when the energy storage module 10 is viewed in the vertical direction V. For example, the elastic pad 500 may be provided so as not to overlap the entire terminal portion.

Meanwhile, as illustrated in FIG. 12, and FIG. 13, the energy storage module according to various exemplary embodiments of the present invention may further include a pressing portion 600 provided at one end portion, in the vertical direction V, of the stack made by stacking the plurality of energy storage devices including the first and second energy storage devices in the vertical direction V. The pressing portion 600 may press the plurality of energy storage devices so that the plurality of energy storage devices in the stack is in close contact with one another.

In more detail, the pressing portion 600 may include a terminal plate 610 provided to be in close contact with one end portion of the stack in the vertical direction V, an internal plate 620 provided to be in close contact with an external surface of the terminal plate in the vertical direction V, an external plate 630 provided to be spaced from the terminal plate in the vertical direction V, and elastic members 640 disposed between the internal plate and the external plate and provided to be in close contact with the internal plate and the external plate. For example, the elastic member 640 may have a coil shape.

Furthermore, as illustrated in FIG. 12, the energy storage module 10 may further include a fastening portion 700 provided to be in close contact with the stack made by stacking the plurality of energy storage devices in the vertical direction V. The fastening portion 700 may have one end portion fastened to an upper end portion of the stack in the vertical direction V and the other end portion fastened to a lower end portion of the stack in the vertical direction V. In more detail, a section of the fastening portion 700, which extends from the upper end portion of the stack to the lower end portion of the stack, may be disposed in the vertical direction V of the stack, and the extending section may be provided to be in close contact with a lateral surface of the stack.

Meanwhile, each of the plurality of terminal portions including the first and second terminal portions may further include a concave-convex region having a shape protruding from the conductive region 210. Therefore, the plurality of energy storage devices 100 may be smoothly connected in series during the process of stacking the plurality of energy storage devices 100 in the vertical direction V. The concave-convex region may protrude upward to a position above the upper surface of the external member 120.

Furthermore, as described above, the energy storage device may be a supercapacitor or a secondary battery.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An energy storage module comprising:
at least two energy storage devices,
wherein the at least two energy storage devices are connected in series,
wherein each of the at least two energy storage devices includes:
an electrode assembly including electrodes and separators, wherein the electrodes and the separators are alternately stacked in a vertical direction of the electrode assembly;
an external member accommodating the electrode assembly therein;
electrode leads joined to the electrodes provided in the electrode assembly;
a first terminal portion provided to be in contact with an upper surface or a lower surface of one of the at least two energy storage devices; and
a second terminal portion provided to be in contact with an upper surface or a lower surface of the other of the at least two energy storage devices,
wherein each of the first and second terminal portions includes:
a conductive region having an electrically conductive surface and provided to face the electrode leads provided in the one and the other of the at least two energy storage devices; and an insulating region provided at one side of the conductive region and having an electrically insulating surface, and wherein the at least two energy storage devices are stacked in the vertical direction so that the electrode leads of the at least two energy storage devices are electrically connected to each other, wherein an area of an upper surface of the insulating region is smaller than an area of the upper surface of each energy storage device, wherein the conductive region and the insulating region overlaps with the electrode assembly in the vertical direction, wherein the insulating region includes:
a connection section extending from the conductive region; and
a bent section extending from the connection section, bent from the connection section in the vertical direction, and provided to surround each of the one and the other of the at least two energy storage devices, and wherein the energy storage module further comprising a cooling member disposed at one side of each of the at least two energy storage devices and provided to be in contact with the bent section.

2. The energy storage module of claim 1,
wherein the electrodes of the electrode assembly include a positive electrode and a negative electrode,
wherein the electrode leads include:
a positive electrode lead having one side joined to the positive electrode; and
a negative electrode lead having one side joined to the negative electrode,
wherein first and second through holes are provided in upper and lower surfaces of the external member in the vertical direction, respectively, and
wherein a portion of the positive electrode lead is provided to face the first through hole in the external member, and a portion of the negative electrode lead is provided to face the second through hole in the external member.

3. The energy storage module of claim 2, wherein the first terminal portion is provided in contact with the upper surface of the one of the at least two energy storage devices, the second terminal portion is provided in contact with the upper surface of the other of the at least two energy storage devices, and the conductive region is provided to face the positive electrode leads provided in the one and the other of the at least two energy storage devices.

4. The energy storage module of claim 1, wherein each of the first and second terminal portions further includes a protruding region extending from the connection section and provided to protrude from the at least two energy storage devices in a horizontal direction of the electrode assembly.

5. The energy storage module of claim 4, wherein at least a portion of a surface of the protruding region has electrical conductivity.

6. The energy storage module of claim 1, wherein each of the at least two energy storage devices further includes a conductive material layer attached to the electrode leads.

7. The energy storage module of claim 3,
wherein each of the at least two energy storage devices further includes a first conductive material layer attached to an upper surface of the positive electrode lead through the first through hole, and wherein the conductive region is attached to the first conductive material layer.

8. An energy storage module comprising:
at least two energy storage devices,
wherein the at least two energy storage devices are connected in series,
wherein each of the at least two energy storage devices includes:
an electrode assembly including electrodes and separators, wherein the electrodes and separators are alternately stacked in a vertical direction of the electrode assembly;
an external member accommodating the electrode assembly therein; and
electrode leads joined to the electrodes provided in the electrode assembly,
a first terminal portion provided to be in contact with an upper surface or a lower surface of one of the at least two energy storage devices; and
a second terminal portion provided to be in contact with an upper surface or a lower surface of the other of the at least two energy storage devices, and
wherein each of the first and second terminal portions includes:
a conductive region having an electrically conductive surface and provided to face the electrode leads provided in the one and the other of the at least two energy storage devices; and
an insulating region provided at one side of the conductive region and having an electrically insulating surface,
wherein the at least two energy storage devices are stacked in the vertical direction so that electrode leads of the at least two energy storage devices are electrically connected to each other,
wherein an area of the upper surface of insulating region is smaller than an area of the upper surface of each energy storage device,
wherein the conductive region and the insulating region overlaps with the electrode assembly in the vertical direction,
wherein the insulating region includes:
a connection section extending from the conductive region; and
a bent section extending from the connection section, bent from the connection section in the vertical direction, and provided to surround each of the one and the other of the at least two energy storage devices,
wherein each of the first and second terminal portions further includes a protruding region extending from the connection section and provided to protrude from the at least two energy storage devices in a horizontal direction of the electrode assembly, and
wherein the energy storage module further including a support member disposed at one side of each of the at least two energy storage devices and provided to be in contact with the protruding region provided in each of the first and second terminal portions.

9. The energy storage module of claim 8, wherein an end portion of the protruding region is inserted into the support member.

10. The energy storage module of claim 8, wherein an end portion of the protruding region is joined to the support member.

11. The energy storage module of claim 1, further including:

an elastic pad provided to be in contact with an upper surface of the external member in the vertical direction.

12. The energy storage module of claim 11, wherein the elastic pad is provided to surround a peripheral region of the conductive region.

13. The energy storage module of claim 1, further including:
a pressing portion provided at one end portion, in the vertical direction, of a stack made by stacking the at least two energy storage devices in the vertical direction,
wherein the pressing portion presses the at least two energy storage devices so that adjacent energy storage devices among the at least two energy storage devices in the stack are in contact with each other.

14. The energy storage module of claim 13, wherein the pressing portion includes:
a terminal plate provided to be in contact with one end portion of the stack in the vertical direction;
an internal plate provided to be in contact with an external surface of the terminal plate in the vertical direction;
an external plate provided to be spaced from the terminal plate in the vertical direction; and
an elastic member disposed between the internal plate and the external plate and provided to elastically support the internal plate and the external plate.

15. The energy storage module of claim 1, further including:
a fastening portion provided to be in contact with a stack made by stacking the at least two energy storage devices in the vertical direction,
wherein the fastening portion has a first end portion fastened to an upper end portion of the stack in the vertical direction and a second end portion fastened to a lower end portion of the stack in the vertical direction.

16. The energy storage module of claim 15, wherein a section of the fastening portion, which extends from the upper end portion of the stack to the lower end portion of the stack, is disposed in the vertical direction of the stack.

17. An energy storage module comprising:
at least two energy storage devices,
wherein the at least two energy storage devices are connected in series,
wherein each of the at least two energy storage devices includes:
an electrode assembly including electrodes and separators, wherein the electrodes and separators are alternately stacked in a vertical direction of the electrode assembly;
an external member accommodating the electrode assembly therein; and
electrode leads joined to the electrodes provided in the electrode assembly,
a first terminal portion provided to be in contact with an upper surface or a lower surface of one of the at least two energy storage devices; and
a second terminal portion provided to be in contact with an upper surface or a lower surface of the other of the at least two energy storage devices, and
wherein each of the first and second terminal portions includes:
a conductive region having an electrically conductive surface and provided to face the electrode leads provided in the one and the other of the at least two energy storage devices; and
an insulating region provided at one side of the conductive region and having an electrically insulating surface,
wherein an area of an upper surface of the insulating region is smaller than an area of the upper surface of each energy storage device,
wherein the conductive region and the insulating region overlaps with the electrode assembly in the vertical direction,
wherein the at least two energy storage devices are stacked in the vertical direction so that electrode leads of the at least two energy storage devices are electrically connected to each other, and
wherein each of the first and second terminal portions further includes a concave-convex region protruding from the conductive region.

* * * * *